United States Patent
Hrach et al.

(10) Patent No.: US 10,934,972 B2
(45) Date of Patent: Mar. 2, 2021

(54) STABILITY MARGIN AND CLEARANCE CONTROL USING POWER EXTRACTION AND ASSIST OF A GAS TURBINE ENGINE

(71) Applicant: UNITED TECHNOLOGIES CORPORATION, Farmington, CT (US)

(72) Inventors: Michael Hrach, West Hartford, CT (US); Michael M. Romero, Manchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 512 days.

(21) Appl. No.: 16/039,929

(22) Filed: Jul. 19, 2018

(65) Prior Publication Data
US 2020/0025149 A1   Jan. 23, 2020

(51) Int. Cl.
*F02C 7/32* (2006.01)
*F02K 5/00* (2006.01)
(Continued)

(52) U.S. Cl.
CPC ............... *F02K 5/00* (2013.01); *F01D 11/16* (2013.01); *F01D 13/00* (2013.01); *F02C 3/04* (2013.01); *F02K 3/06* (2013.01); *F01D 11/20* (2013.01); *F01D 11/22* (2013.01); *F01D 15/10* (2013.01); *F01D 17/02* (2013.01); *F02C 7/275* (2013.01); *F02C 7/32* (2013.01); *F02C 7/36* (2013.01);
(Continued)

(58) Field of Classification Search
CPC .......... F01D 13/00; F01D 15/10; F01D 11/20; F01D 11/22; F01D 11/16; F01D 17/24; F02C 7/32; F02C 7/36; F02C 7/277; F02C 7/268; F02C 3/04; F02K 5/00; F02K 3/06

See application file for complete search history.

(56) References Cited

U.S. PATENT DOCUMENTS 7,285,871 B2    10/2007  Derouineau
7,418,821 B2 *   9/2008  Butt ..................... F01D 25/20
                                                    60/778
(Continued)

FOREIGN PATENT DOCUMENTS

EP    0798454    10/1997
EP    3130783     2/2017
(Continued)

OTHER PUBLICATIONS

European Patent Office, European Search Report dated Dec. 18, 2019 in Application No. 19187008.8.

*Primary Examiner* — Kenneth J Hansen
*Assistant Examiner* — Behnoush Haghighian
(74) *Attorney, Agent, or Firm* — Snell & Wilmer L.L.P.

(57) ABSTRACT

A method of maintaining rotor tip clearance and compressor operational line during a transient operation of a gas turbine engine is disclosed. In various embodiments, the method includes applying high spool auxiliary power to a high speed spool for a first time period, applying low spool auxiliary power to a low speed spool for a second time period, sensing one or more operational parameters of the gas turbine engine during the transient operation, and ceasing application of power to the high speed spool, based on the one or more operational parameters.

18 Claims, 6 Drawing Sheets

(51) Int. Cl.
*F01D 11/16* (2006.01)
*F01D 13/00* (2006.01)
*F02C 3/04* (2006.01)
*F02K 3/06* (2006.01)
*F01D 17/02* (2006.01)
*F02C 7/36* (2006.01)
*F02C 7/275* (2006.01)
*F01D 11/20* (2006.01)
*F01D 15/10* (2006.01)
*F01D 11/22* (2006.01)

(52) U.S. Cl.
CPC ...... *F05D 2220/32* (2013.01); *F05D 2220/76* (2013.01); *F05D 2260/80* (2013.01); *F05D 2270/102* (2013.01); *F05D 2270/301* (2013.01); *F05D 2270/304* (2013.01)

(56) References Cited

U.S. PATENT DOCUMENTS

| | | | | |
|---|---|---|---|---|
| 7,481,062 B2* | 1/2009 | Gaines | F02C 7/36 | 60/792 |
| 7,513,120 B2* | 4/2009 | Kupratis | F01D 15/10 | 60/39.24 |
| 7,552,582 B2* | 6/2009 | Eick | F02C 3/107 | 60/39.163 |
| 7,861,533 B2* | 1/2011 | Dooley | F02C 7/32 | 60/778 |
| 7,997,085 B2* | 8/2011 | Moniz | F01D 15/10 | 60/778 |
| 8,039,983 B2* | 10/2011 | Cote | H02P 9/04 | 290/32 |
| 8,304,927 B2* | 11/2012 | Cote | H02P 9/04 | 290/32 |
| 8,500,583 B2* | 8/2013 | Goi | F02C 7/275 | 475/5 |
| 8,684,304 B2* | 4/2014 | Burns | B64D 27/00 | 244/58 |
| 8,690,099 B2* | 4/2014 | Burns | B64D 41/00 | 244/58 |
| 8,727,270 B2* | 5/2014 | Burns | F02C 7/36 | 244/58 |
| 9,021,780 B2* | 5/2015 | Bowman | F02C 7/32 | 60/39.24 |
| 9,045,996 B2 | 6/2015 | Anghel et al. | | |
| 9,200,592 B2* | 12/2015 | Berryann | F01D 19/00 | |
| 9,963,095 B2 | 5/2018 | Huang et al. | | |
| 10,208,675 B2* | 2/2019 | Mackin | F02C 7/36 | |
| 10,336,461 B2* | 7/2019 | Mackin | B64D 27/10 | |
| 10,377,498 B2* | 8/2019 | Mackin | B64D 15/12 | |
| 2001/0001845 A1 | 5/2001 | Khalid et al. | | |
| 2006/0225431 A1* | 10/2006 | Kupratis | F01D 15/10 | 60/791 |
| 2006/0272313 A1* | 12/2006 | Eick | F02C 3/107 | 60/39.63 |
| 2007/0151258 A1* | 7/2007 | Gaines | F02C 7/36 | 60/792 |
| 2008/0072568 A1* | 3/2008 | Moniz | F01D 15/10 | 60/226.1 |
| 2008/0148881 A1* | 6/2008 | Moniz | F02C 7/32 | 74/15.6 |
| 2009/0205341 A1* | 8/2009 | Muldoon | F02C 7/32 | 60/792 |
| 2010/0133813 A1* | 6/2010 | Cote | H02P 9/04 | 290/32 |
| 2010/0162719 A1* | 7/2010 | Bowman | F02C 7/32 | 60/773 |
| 2010/0162720 A1* | 7/2010 | Bowman | F02C 7/32 | 60/773 |
| 2010/0164234 A1* | 7/2010 | Bowman | F02C 7/32 | 290/1 R |
| 2011/0061396 A1* | 3/2011 | Dooley | F02C 7/262 | 60/778 |
| 2011/0101693 A1* | 5/2011 | Goi | F02C 7/275 | 290/46 |
| 2012/0091716 A1* | 4/2012 | Cote | H02P 9/04 | 290/46 |
| 2012/0119020 A1* | 5/2012 | Burns | B64D 27/00 | 244/58 |
| 2012/0119021 A1* | 5/2012 | Burns | F02C 7/36 | 244/58 |
| 2012/0221157 A1* | 8/2012 | Finney | G06F 1/26 | 700/287 |
| 2013/0000317 A1* | 1/2013 | Berryann | F02C 3/113 | 60/778 |
| 2013/0031912 A1* | 2/2013 | Finney | F01D 15/10 | 60/778 |
| 2013/0076120 A1* | 3/2013 | Wagner | B64D 33/00 | 307/9.1 |
| 2013/0098060 A1* | 4/2013 | Suciu | F02C 7/32 | 60/783 |
| 2017/0044989 A1* | 2/2017 | Gemin | F02C 7/26 | |
| 2017/0190441 A1* | 7/2017 | Mackin | F01D 25/36 | |
| 2017/0210478 A1* | 7/2017 | Mackin | B64D 15/12 | |
| 2017/0226934 A1 | 8/2017 | Robic et al. | | |
| 2017/0334377 A1* | 11/2017 | Klemen | H02K 7/1823 | |
| 2017/0335710 A1* | 11/2017 | Klemen | H02P 9/04 | |
| 2017/0335713 A1* | 11/2017 | Klemen | F01D 17/24 | |
| 2017/0335795 A1* | 11/2017 | Klemen | F01D 17/24 | |
| 2018/0223740 A1* | 8/2018 | Forest | F02C 7/36 | |
| 2018/0266329 A1* | 9/2018 | Mackin | F02C 7/36 | |

FOREIGN PATENT DOCUMENTS

EP 3246528 11/2017
FR 3024751 2/2016

* cited by examiner

STABILITY MARGIN AND CLEARANCE CONTROL USING POWER EXTRACTION AND ASSIST OF A GAS TURBINE ENGINE

FIELD

The present disclosure relates generally to gas turbine engines and, more particularly, methods and apparatus used to control stability and turbine rotor blade clearance in gas turbine engines during transient operation.

BACKGROUND

A gas turbine engine typically includes a fan section, a compressor section, a combustor section and a turbine section. Air entering the compressor section is compressed and delivered into the combustion section, where it is mixed with fuel and ignited to generate a high-speed exhaust gas flow. The high-energy exhaust gas flow expands through the turbine section to drive the compressor and the fan section. The compressor section typically includes low and high pressure compressors, and the turbine section includes low and high pressure turbines. The high pressure turbine drives the high pressure compressor through an outer shaft to form a high spool, and the low pressure turbine drives the low pressure compressor through an inner shaft to form a low spool. The fan section may also be driven by the low spool inner shaft, either directly or indirectly through a fan drive gear system.

Over the course of an operating cycle of a gas turbine engine, the compressor section may experience compressor stall. Compressor stall is a limiting factor in the operation of gas turbine engines. For example, an unstable flow may develop in the compressor section during acceleration. Such unstable flow may lead to stall, which may increase turbine temperature and mechanical vibration and decrease rotor tip clearance. During transient engine operation (e.g., during engine acceleration), the compressor operating line may shift significantly with respect to steady-state conditions. For example, the flow exiting the compressor as a function of pressure may be significantly reduced as fuel flow is increased during an engine acceleration transient, thereby substantially changing the compressor operating line. Methods and apparatus tending to reduce the onset of stall during transient operation are therefore desirable.

SUMMARY

A method of maintaining rotor tip clearance during a transient operation of a gas turbine engine is disclosed. In various embodiments, the method includes applying auxiliary high spool power to a high speed spool for a first time period, applying low spool auxiliary power to a low speed spool for a second time period, sensing one or more operational parameters of the gas turbine engine during the transient operation, and ceasing application of power to the high speed spool, based on the one or more operational parameters.

In various embodiments, the applying high spool auxiliary power to the high spool comprises driving a high spool shaft connected to the high speed spool. In various embodiments, the applying low spool auxiliary power to the low speed spool comprises driving a low spool shaft connected to the low speed spool. In various embodiments, the driving the high spool shaft comprises powering a high spool tower-shaft via an electric motor. In various embodiments, the driving the low spool shaft comprises powering a low spool tower-shaft via an electric motor.

In various embodiments, the one or more operational parameters includes a high speed spool rotational speed and a low speed spool rotational speed. In various embodiments, the one or more operational parameters includes a high pressure compressor pressure ratio and a low pressure compressor pressure ratio.

In various embodiments, the transient operation is a step climb, the applying the high spool auxiliary power to the high speed spool for the first time period and the applying the low spool auxiliary power to the low speed spool for the second time period are configured to commence simultaneously and the applying high spool auxiliary power to a high speed spool ceases following the first time period. In various embodiments, the applying low spool auxiliary power to the low speed spool continues until expiration of the step climb. In various embodiments, a rotational speed of the high speed spool remains constant following the first time period.

A system for maintaining acceptable rotor tip clearance during a transient operation of a gas turbine engine is disclosed. In various embodiments, the system includes a high speed spool connecting a high pressure compressor to a high pressure turbine, a low speed spool connecting a low pressure compressor to a low pressure turbine, a high speed spool auxiliary power input configured to provide power for a first time period during the transient operation, a low speed spool auxiliary power input configured to provide power for a second time period during the transient operation, and a controller configured to monitor performance of the gas turbine engine during the transient operation and to cease power to the high speed auxiliary power input based on one or more sensed parameters.

In various embodiments, the high speed spool auxiliary power input comprises a high spool tower shaft connected to the high speed spool. In various embodiments, the low speed spool auxiliary power input comprises a low spool tower shaft connected to the low speed spool. In various embodiments, a high spool tower shaft electric motor is connected to the high spool tower shaft. In various embodiments, a low spool tower shaft electric motor connected to the low spool tower shaft.

In various embodiments, a high speed spool rotational speed sensor and a low speed spool rotational speed sensor are configured to provide the one or more sensed parameters to the full authority digital engine control. In various embodiments, a high pressure inlet pressure sensor and a high pressure outlet pressure sensor at the high pressure compressor are configured to provide the one or more sensed parameters to the controller. In various embodiments, a low pressure inlet pressure sensor and a low pressure outlet pressure sensor at the low pressure compressor are configured to provide the one or more sensed parameters to the controller.

In various embodiments, the transient operation is a step climb and the controller is configured to cease power to the high speed spool auxiliary power input following the first time period. In various embodiments, a rotational speed of the high speed spool remains constant following the first time period.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
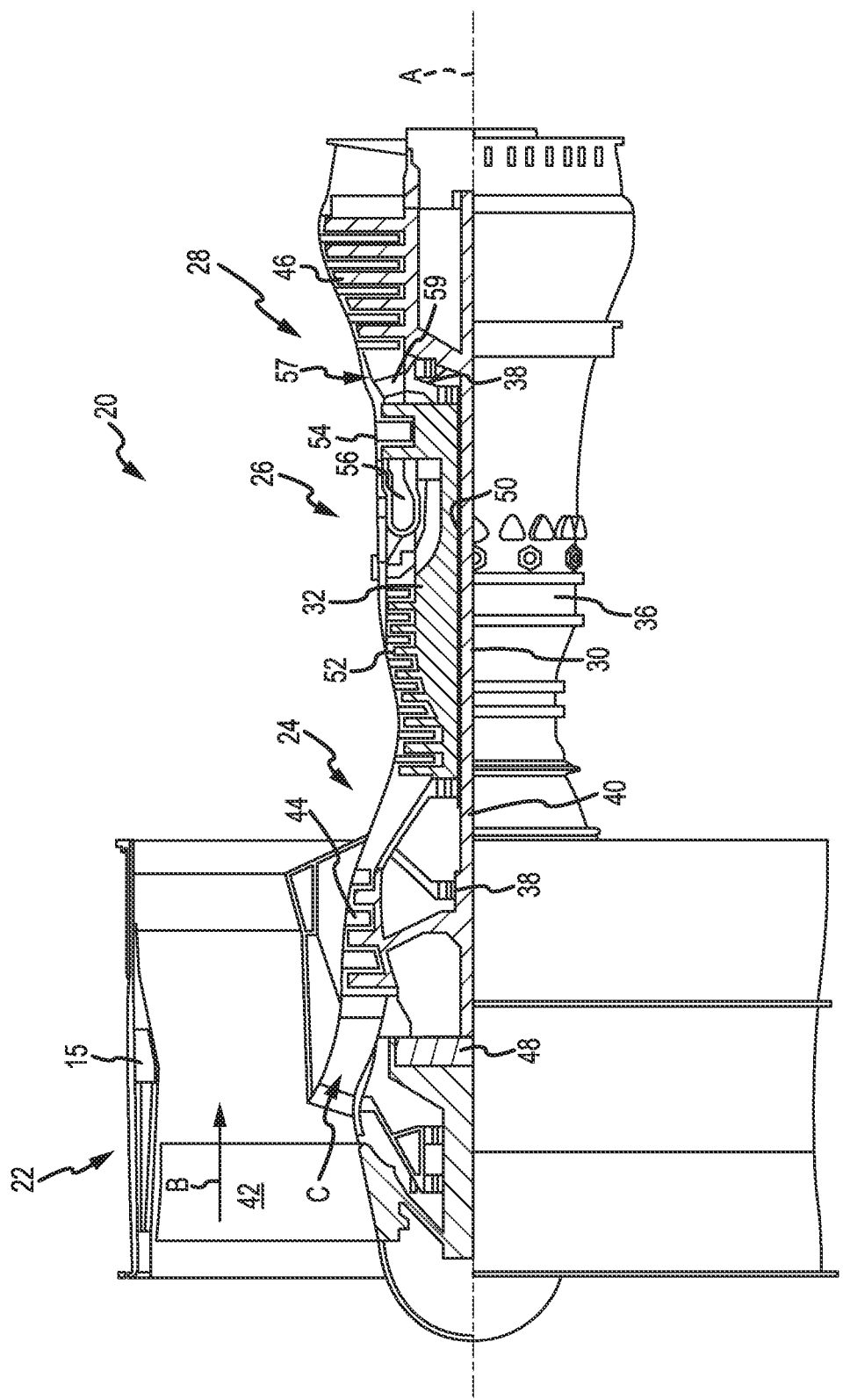
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54.

A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with their longitudinal axes. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the fan drive gear system 48.

During operation of the gas turbine engine 20, the air in the core flow path is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. As will be described in further detail below, the low speed spool 30 may be engaged with and configured to drive a low spool tower shaft and the high speed spool 32 may be engaged with and configured to be driven by a high spool tower shaft. The low spool tower shaft and the high spool tower shaft may be engaged with motors, generators and a differential gear box, collectively configured for power extraction, amplification and redistribution within and among the various components of the gas turbine engine 20.

Figure 2:
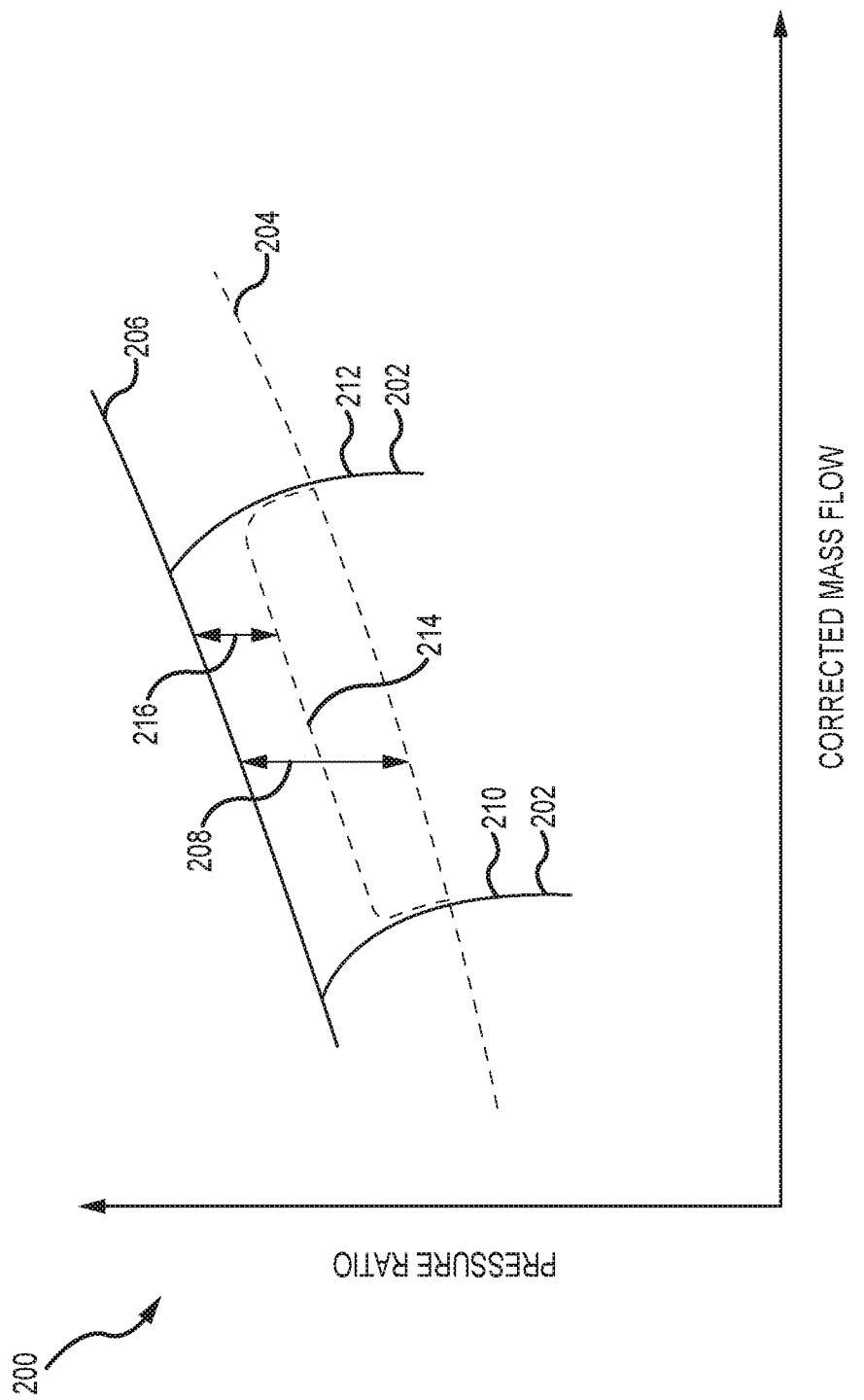
FIG. 2 is a graph illustrating a compressor map and transient behavior of a compressor, in accordance with various embodiments.

The operation and performance of the gas turbine engine 20 during transient operation may be affected by aerodynamic stall associated with the compressor section 24. This condition typically results from excessive compressor airfoil loading, resulting in flow separation from the suction sides of one or more airfoils within the compressor section 24. Significant degradation of compressor and engine performance may result from such aerodynamic stall. A generic compressor map 200 with speed lines 202, operating line 204, stall line 206, and stall margin 208, as shown in FIG. 2, illustrates the compressor stall margin limit in greater detail. In this figure, nominal compressor performance is depicted as a series of lines of constant corrected compressor speed (e.g., the speed lines 202) defining the relationship of compressor pressure ratio as a function of compressor corrected flow at that speed. Furthermore, the compressor stall line indicating the upper limit of stall-free operation is depicted as a stall pressure ratio as a function of corrected flow. During a transient, such as produced by rapid acceleration following an increase in fuel flow rate to the combustor, the compressor accelerates from a first rotational speed 210 to a second rotational speed 212 and, under normal conditions (e.g., stall free conditions) follows a transient operating line 214 while accelerating from the first rotational speed 210 to the second rotational speed 212. Such transient may occur, for example, during a step climb or a takeoff climb or during an acceleration. As illustrated, during the transient, the stall margin 208 typical of steady state operation (or very slow acceleration) is reduced to a transient stall margin 216. The transient stall margin ("TSM") may be expressed as TSM=($PR_{stall}$–PR)/PR*100, where $PR_{stall}$ is the pressure ratio at the stall line 206 and PR is the pressure ratio of the transient operating line 214. Stall of the compressor may occur where TSM≤0—e.g., where the transient operating line 214 exceeds the stall line 206.

Figure 3:
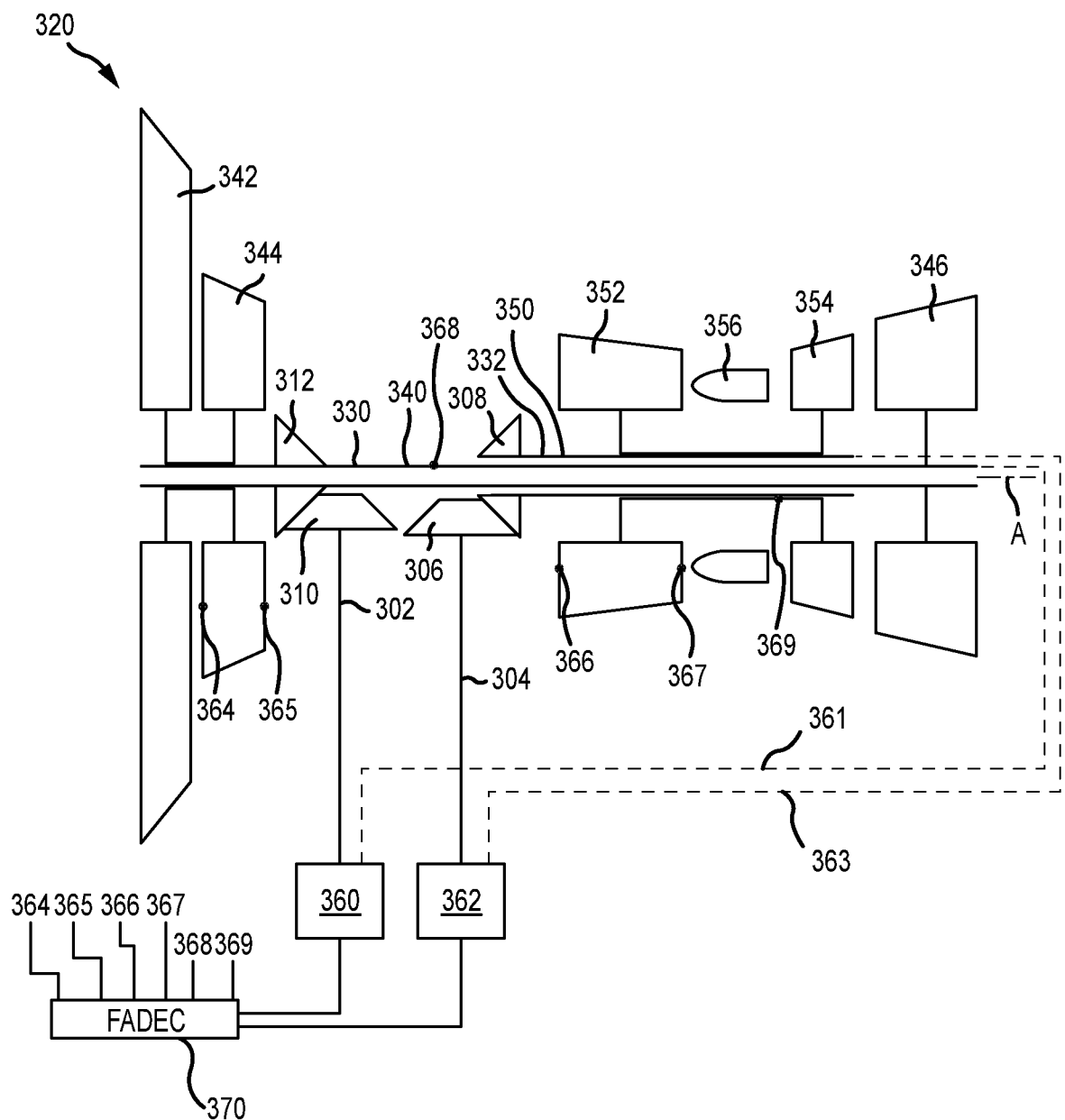
FIG. 3 is a schematic diagram of a gas turbine engine, in accordance with various embodiments.

Referring now to FIG. 3, a schematic illustration of a gas turbine engine 320 is provided. Similar to the description above with reference to FIG. 1, the gas turbine engine 320 generally includes a low speed spool 330 and a high speed spool 332 mounted for rotation about an engine central longitudinal axis A. The low speed spool 330 generally includes an inner shaft 340 that interconnects a fan 342, a low pressure compressor 344 and a low pressure turbine 346. The high speed spool 332 includes an outer shaft 350 that interconnects a high pressure compressor 352 and a high pressure turbine 354. A combustor 356 is arranged in the gas turbine engine 320 between the high pressure compressor 352 and the high pressure turbine 354. The inner shaft 340 and the outer shaft 350 are concentric and rotate via bearing systems about the engine central longitudinal axis A, which is collinear with the longitudinal axes of the inner shaft 340 and the outer shaft 350.

The gas turbine engine 320 further includes a low spool power assist 360 and a high spool power assist 362. In various embodiments, the low spool power assist 360 is connected to the low speed spool 330 by a low spool tower shaft 302 and the high spool power assist 362 is connected to the high speed spool 332 by a high spool tower shaft 304. In various embodiments, the low spool tower shaft 302 includes a low spool bevel gear 310 in meshing engagement with a low spool gear pedestal 312. The low spool gear pedestal 312 is coupled to the low speed spool 330, which is similar to the low speed spool 30 described above with reference to FIG. 1. Similarly, the high spool tower shaft 304 includes a high spool bevel gear 306 in meshing engagement with a high spool gear pedestal 308. The high spool gear pedestal 308 is coupled to the high speed spool 332, which is similar to the high speed spool 32 described above with reference to FIG. 1. In various embodiments, the high spool gear pedestal 308 and the low spool gear pedestal 312 are mounted on the high speed spool 332 and the low speed spool 330, respectively.

In various embodiments, the low spool power assist 360 is connected directly to the low speed spool 330 by a low spool shaft 361 and the high spool power assist 362 is connected directly to the high speed spool 332 by a high spool shaft 363. Such embodiments may be configured, by way of example, as one or more power assist motors positioned in a tail cone and connected to the low speed spool 330 by the low spool shaft 361 to the high speed spool 332 by the high spool shaft 363. In various embodiments, the low spool power assist 360 and the high spool power assist 362 are electric motors powered by one or more of an auxiliary power unit a storage battery or a capacitor, each of which may be interconnected to provide the required assist to the gas turbine engine during transient operation. In various embodiments, the low spool power assist 360 and the high spool power assist 362 comprise turbine units configured to operate, for example, by pressurized fluid, such as air, supplied by or bled from an auxiliary power unit.

In various embodiments, the gas turbine engine 320 further includes an inlet pressure sensor 364 and an outlet pressure sensor 365 at the low pressure compressor 344 and an inlet pressure sensor 366 and an outlet pressure sensor 367 at the high pressure compressor 352. In various embodiments, the gas turbine engine further includes a low spool speed sensor 368 and a high spool speed sensor 369. During a transient operation, the various sensors provide outputs to a controller which, in various embodiments, is linked to or is part of a full authority digital engine control ("FADEC") 370 that controls operation of the low spool power assist 360 and the high spool power assist 362. In various embodiments, the various pressure outputs input to the FADEC may be synthesized from related data, including spool speeds and flow rate and temperature data.

Figure 4:
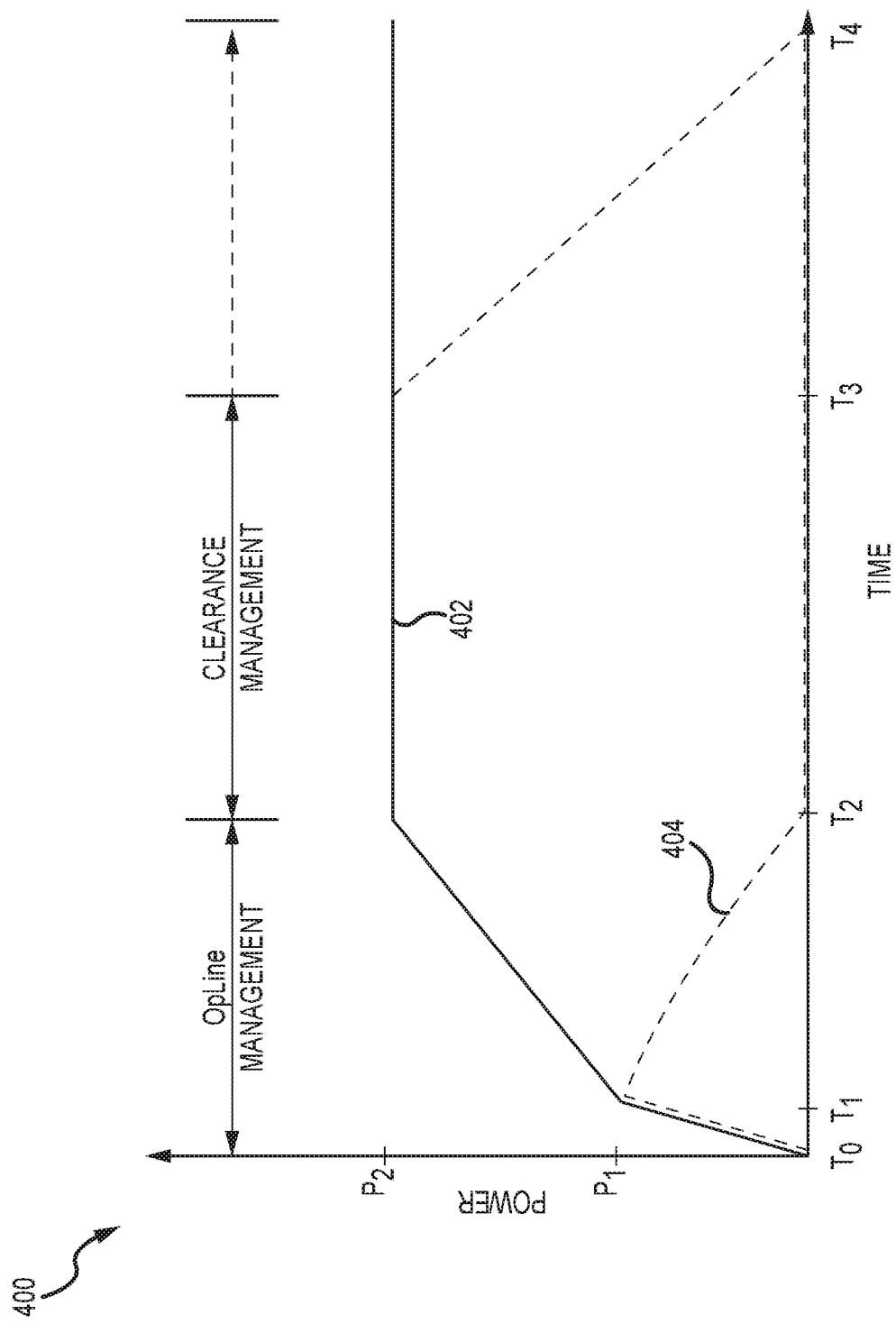
FIG. 4 is a graph illustrating a power input schedule to high and low spools of a gas turbine engine, in accordance with various embodiments.

Referring now to FIG. 4, a power assist schedule 400 is illustrated, in accordance with various embodiments. In various embodiments, the power assist schedule 400 comprises an input to a FADEC, such as, for example, the FADEC 370 described above with reference to FIG. 3, and controls power inputs to a low spool power assist and a high spool power assist, such as, for example, the low spool power assist 360 and the high spool power assist 362 described above with reference to FIG. 3. In various embodiments, during a transient—e.g., an acceleration caused by an increase in fuel flow to the combustor of a gas turbine engine, such as, for example, the gas turbine engine 320 described above with reference to FIG. 3—the low spool power assist and the high spool power assist will be operated at different power levels for different periods of time. For example, during such transient, the low spool power assist follows a low spool power assist schedule 402 and the high spool power assist follows a high spool power assist schedule 404. The response of the high spool power assist is related to the fuel addition and the operating line control desired for each type of maneuver performed (e.g. takeoff or step climb). The response of the low spool power assist is related to the power necessary to maintain a substantially flat high spool response (e.g., a substantially constant rotational speed (N2) of the high spool) after the high spool has accelerated to its quasi-steady state value with low spool assist active. (See, e.g., FIG. 5C). The magnitude of the low spool power assist can also be related to the amount of power assist the engine requires to develop its necessary amount of thrust and the capability of the power electronics.

By way of non-limiting example, in various embodiments, following commencement of the transient—e.g., following an increase in the rate of fuel flow to the combustor initiated by movement of the throttle—both the low spool power assist and the high spool power assist are activated until a first time $T_1$ and first power level $P_1$ are reached. Following the first time $T_1$, power to the high spool power assist is phased out during the period of time until a second time $T_2$ is reached, and remains at zero for the duration of the transient. During this same period of time, power to the low spool power assist increases to a second power level $P_2$. During, for example, a transient not involving a change in altitude, the low spool power assist remains at the second power level until a third time $T_3$, following which power to the low spool power assist is gradually phased out until a fourth time $T_4$ is reached. During other transients, such as, for example, those accompanying a step climb or a takeoff climb, power to the low spool power assist remains at power level $P_2$ until altitude is reached, after which the power is gradually phased out. In various embodiments, the duration of the low spool power assist is related to whether the engine benefits from continued supplemental boost supplied via the low spool power assist. One such configuration incorporates a low spool power assist that continues throughout a maneuver, e.g., during a step climb to a higher altitude, beyond the point where transient operation substantially terminates (e.g., out to time $T_4$ in FIG. 4). This configuration has the potential to reconfigure thermodynamic parameters—e.g., the various Brayton cycle parameters—in order to operate more efficiently at the expense of added weight from batteries or other means of supplying external power to provide the power assist. Another such configuration incorporates a low spool power assist during the transient period only, after which the low spool power assist gradually reduces to zero. As will be discussed further below, the two-phase approach to power assist provides a first phase ($0 \leq t \leq T_2$) that controls OpLine management—e.g., management of the transient stall margin to remain within the boundaries of the operating line and the stall line—and a second phase ($T2 \leq t \leq T_3$ or $T_4$) that controls tip clearance management within the high pressure turbine. In various embodiments, however, the boundary between the OpLine management phase and the tip clearance management phase may overlap—e.g., the tip clearance management phase commences before the OpLine management phase terminates.

Figure 5A:
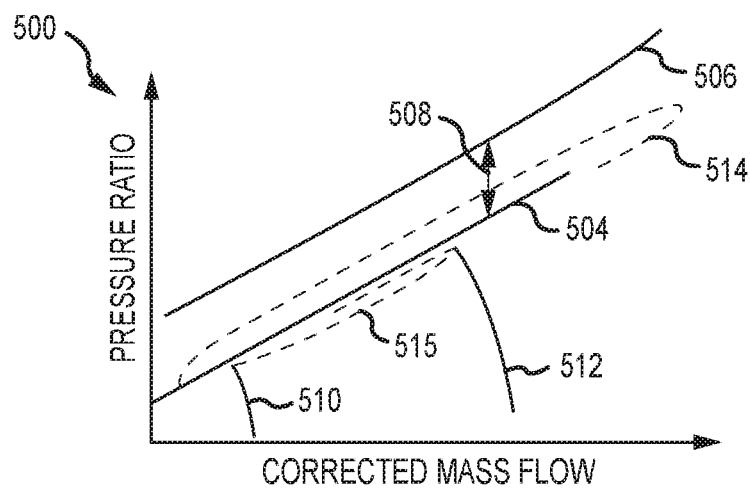
FIGS. 5A, 5B and 5C are graphs showing compressor performance, turbine rotor tip clearance and high speed spool rotational speed, in accordance with various embodiments.
Figure 5B:
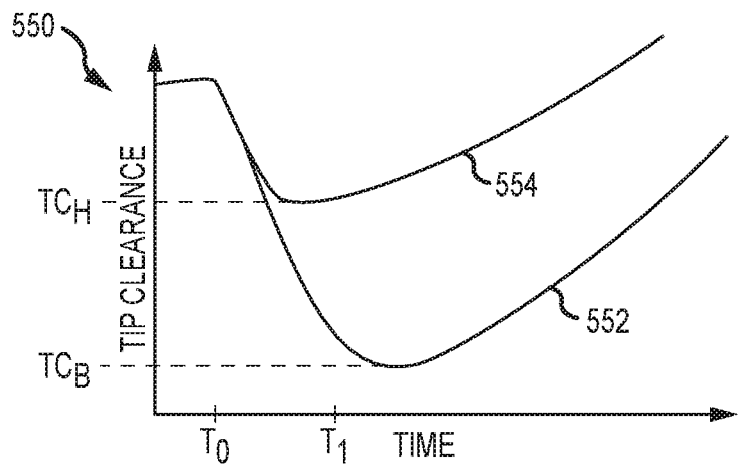
Figure 5C:
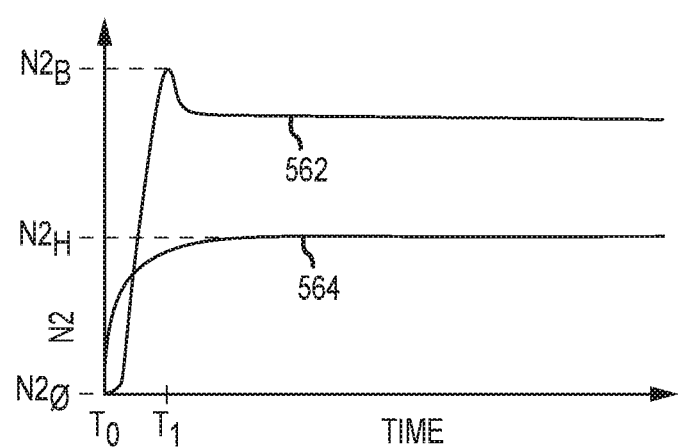

Referring now to FIGS. 5A, 5B and 5C, graphs depicting compressor performance, tip clearance and high spool speed (N2), respectively, are provided, during a transient involving a step climb, in accordance with various embodiments. Referring to the graph of compressor performance 500, a first speed line 510 and a second speed line 512, an operating line 504, a stall line 506, and a stall margin 508 are depicted in similar fashion to the lines described above with reference to FIG. 2. A baseline transient operating line 514 illustrates the behavior of the compressor during a transient, from the first speed line 510 to the second speed line 512 and then back toward the first speed line 510, with no power provided to either the first (or low) spool power assist or to the second (or high) spool power assist. The transient stall margin characteristics of the baseline transient operating line 514 are consistent with those described above with reference to FIG. 2—e.g., the baseline transient operating line approaches the stall line during the transient phase prior to returning to the operating line 504. A hybrid transient operating line 515 is also provided, in accordance with the two-phase power assist described above with reference to FIG. 4. As indicated, during the transient, the hybrid operating line remains substantially on or close to the operating line 504 and, advantageously, maintains a lower transient stall margin ("TSM") than does the baseline mode of operation.

Referring now to the graph depicting tip clearance 550 in FIG. 5B, a baseline tip clearance plot 552 indicates a sudden decrease in clearance of the rotor tips to a minimum value $TC_B$ in the high pressure turbine following initiation of the transient at $T_0$, followed by a slow relaxation of the tip clearance back to a steady state value. In various embodiments, the reduction in tip clearance corresponds with the rapid increase in rotational speed of the high pressure turbine following the increase in the rate of fuel flow, thereby suggesting a benefit in reducing the speed of the high speed spool as quickly as possible following the initial transient. Referring still to the same graph, a hybrid tip clearance plot 554 also indicates a sudden decrease in clearance of the rotor tips to a minimum value $TC_H$ in the high pressure turbine following initiation of the transient at $T_0$, followed by a slow relaxation of the tip clearance back to a steady state value. However, in the hybrid case, the minimum value of tip clearance $TC_H$ may be substantially greater than the minimum value of tip clearance $TC_B$ for the baseline case, leading to a more desirable transient operating condition.

Referring now to FIG. 5C, a graph 560 depicts rotational speed (N2) of the high speed spool above a nominal operating speed $N2_0$ prior to initiation of the transient at $T_0$. A baseline rotational speed plot 562 indicates a rapid rise in rotational speed to a maximum value $N2_B$, following initiation of the transient at $T_0$, followed by a slight relaxation in speed to a steady state value. Referring to the same graph, a hybrid rotational speed plot 564 indicates a rapid rise in rotational speed to a maximum value $N2_H$, which is also near its steady state value. Advantageously, the maximum value of the hybrid case ($N2_H$) is substantially less than the maximum value of the baseline case ($N2_B$) as is the situation for both steady state values. The lower value of rotational speed for the hybrid case ($N2_H$) is believed to correspond with and lead to the more favorable value of tip clearance described above and depicted in the hybrid tip clearance plot 554.

Referring now to FIGS. 4 and 5A, 5B and 5C, further beneficial aspects of the two-phase application of power to the low spool power assist and to the high spool power assist may be seen. Applying power to both the low spool power assist and to the high spool power assist during the first phase of the transient—e.g., from $T_0$ to $T_2$—increases the rotational speed of the high speed spool. The increased speed of the high speed spool is desirable for OpLine management, such that the transient stall margin may be kept as within a desirable margin—e.g., TSM=10-20%—during the transient. Phasing out the high spool power assist at $T_2$ then allows the high speed spool to maintain a constant speed ($N2_H$) throughout the transient following the initial acceleration from $N_0$. Continued operation of the low spool power assist—e.g., from $T_2$ to $T_3$ or $T_4$—enables the high speed spool to operate at a lower rotational speed than might otherwise be required during the transient, thereby maintaining an acceptable tip clearance in the high pressure turbine between the rotor tips and the turbine casing.

Figure 6:
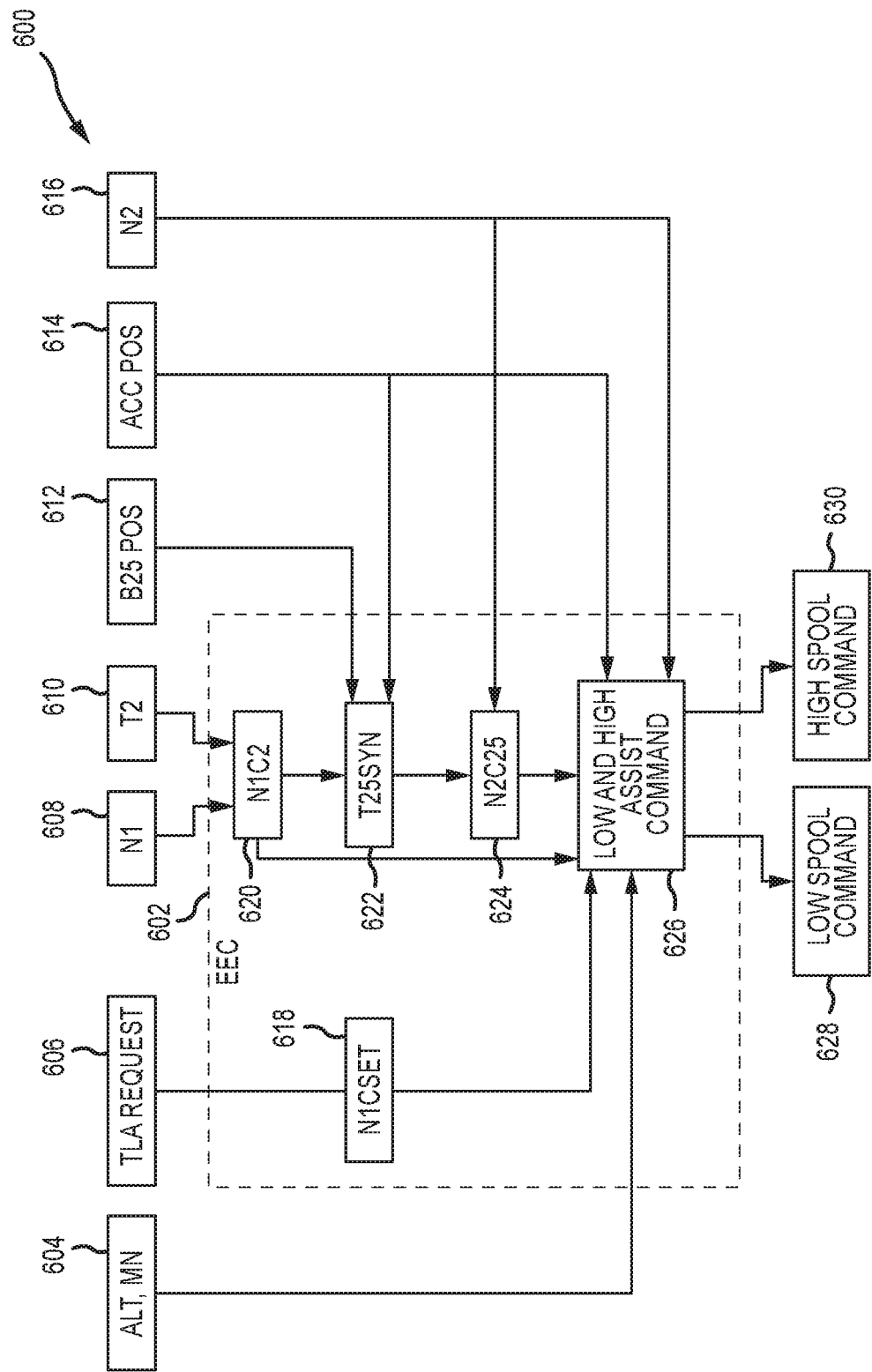
FIG. 6 is a control diagram, illustrating sensor inputs and power assist outputs, in accordance with various embodiments.

Referring now to FIG. 6, a control diagram 600 for operation of a controller is provided, illustrating sensor inputs and the flow of data obtained from the sensor inputs to schedule the high spool and low spool power assists, in accordance with various embodiments. In various embodiments, the control diagram 600 provides for an electronic engine controller 602 (or controller). Inputs to the electronic engine controller 602 include altitude and Mach number data, obtained from an altitude and Mach number sensor(s) 604 ("Alt, MN"); throttle level sensing, obtained from a throttle lever angle sensor 606 ("TLA Request"); low spool speed data, obtained from a low spool speed sensor 608 ("N1"); temperature data, obtained from a temperature sensor 610 ("T2") positioned proximate an inlet to the low pressure compressor; low pressure compressor outlet relief bleed data, obtained from a feedback sensor 612 ("B25 POS") configured to provide feedback data relative to the operational status of a bleed valve positioned proximate the exit of the low pressure compressor; tip clearance control data, obtained from an active clearance control sensor 614 ("ACC POS") and high spool speed data, obtained from a high spool speed sensor 616 ("N2").

In various embodiments, the electronic engine controller 602 determines a low spool speed setting 618 ("N1CSET") based on the throttle lever angle sensor 606 and a corrected low spool speed value 620 ("N1C2"), based on the corrected mass flow proximate the inlet of the low pressure compressor. In various embodiments, the difference between N1CSET and N1C2 may be used to adjust the level of power assist applied to one or both of the low speed spool and the high speed spool. In various embodiments, a temperature value 622 ("T25SYN") proximate the outlet of the low pressure compressor may be synthesized based on the corrected low speed spool value 620, the feedback sensor 612 ("B25 POS"), and the tip clearance control data, obtained from the active clearance control sensor 614 ("ACC POS"). In various embodiments, active clearance control may be affected by spraying cooling fluid—e.g., compressed air bled from a compressor stage—about the outer surface of the engine casing, causing the engine casing to contract in a radial direction. Further, in various embodiments, the clearance control sensor may operate indirectly by measuring the temperature of the engine casing and the temperature of the gas within the turbine or directly by measuring the actual tip clearance between the blade tips and the inner surface of the engine casing. In various embodiments, a corrected high spool speed value 624 ("N2C25") is determined using the temperature value 622 ("T25SYN") and the high spool speed data, obtained from the high spool speed sensor 616 ("N2"). In various embodiments, the data representing the corrected high spool speed value 624 ("N2C25"), the tip clearance control data, obtained from the active clearance control sensor 614 ("ACC POS") and the high spool speed data, obtained from the high spool speed sensor 616 ("N2") may be used to adjust the level of power assist applied to either or both of the low speed spool and the high speed spool. In various embodiments, the levels of low and high power assist determined by the electronic engine controller 602 are finally provided by a low and high assist command module 626 and then provided as a low spool command 628 and a high spool command 630 to the mechanisms—e.g., the electric motor(s) used to provide auxiliary power to a low spool power assist and a high spool power assist as described above.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of maintaining rotor tip clearance during a transient operation of a gas turbine engine following an increase in a rate of fuel flow to a combustor of the gas turbine engine, comprising:

applying a high spool auxiliary power to a high speed spool until a first power level $P_1$ is reached at a first time $T_1$, followed by phasing out the high spool auxiliary power until a zero power level is reached at a second time $T_2$, greater than $T_1$;

applying a low spool auxiliary power to a low speed spool for until the first power level $P_1$ is reached at the first time $T_1$, followed by increasing the low spool auxiliary power until a second power level $P_2$ is reached at the second time $T_2$;

sensing one or more operational parameters of the gas turbine engine during the transient operation; and ceasing application of the high spool auxiliary power to the high speed spool, based on the one or more operational parameters.

2. The method of claim 1, wherein the applying the high spool auxiliary power to the high speed spool comprises driving a high spool shaft connected to the high speed spool.

3. The method of claim 2, wherein the applying the low spool auxiliary power to the low speed spool comprises driving a low spool shaft connected to the low speed spool.

4. The method of claim 3, wherein the driving the high spool shaft comprises powering a high spool tower-shaft via an electric motor.

5. The method of claim 3, wherein the driving the low spool shaft comprises powering a low spool tower-shaft via an electric motor.

6. The method of claim 1, wherein the one or more operational parameters includes a high speed spool rotational speed and a low speed spool rotational speed.

7. The method of claim 6, wherein the one or more operational parameters includes a high pressure compressor pressure ratio and a low pressure compressor pressure ratio.

8. The method of claim 1, wherein the applying the low spool auxiliary power to the low speed spool continues until expiration of the transient operation.

9. The method of claim 8, wherein a rotational speed of the high speed spool remains constant following the first time $T_1$.

10. A system for maintaining rotor tip clearance during a transient operation of a gas turbine engine, comprising:
a high speed spool connecting a high pressure compressor to a high pressure turbine;
a low speed spool connecting a low pressure compressor to a low pressure turbine;
a high speed spool auxiliary power input configured to provide a high spool auxiliary power during the transient operation until a first power level $P_1$ is reached at a first time $T_1$, followed by phasing out the high spool auxiliary power until a zero power level is reached at a second time $T_2$, greater than $T_1$;
a low speed spool auxiliary power input configured to provide a low spool auxiliary power during the transient operation until the first power level $P_1$ is reached at the first time $T_1$, followed by increasing the low spool auxiliary power until a second power level $P_2$ is reached at the second time $T_2$; and
a controller configured to monitor performance of the gas turbine engine during the transient operation and to cease the high spool auxiliary power to the high speed auxiliary power input based on one or more sensed parameters.

11. The system of claim 10, wherein the high speed spool auxiliary power input comprises a high spool tower shaft connected to the high speed spool.

12. The system of claim 11, wherein the low speed spool auxiliary power input comprises a low spool tower shaft connected to the low speed spool.

13. The system of claim 12, further comprising a high spool tower shaft electric motor connected to the high spool tower shaft.

14. The system of claim 13, further comprising a low spool tower shaft electric motor connected to the low spool tower shaft.

15. The system of claim 14, further comprising a high speed spool rotational speed sensor and a low speed spool rotational speed sensor configured to provide the one or more sensed parameters to the full authority digital engine control.

16. The system of claim 15, further comprising a high pressure inlet pressure sensor and a high pressure outlet pressure sensor at the high pressure compressor configured to provide the one or more sensed parameters to the controller.

17. The system of claim 16, further comprising a low pressure inlet pressure sensor and a low pressure outlet pressure sensor at the low pressure compressor configured to provide the one or more sensed parameters to the controller.

18. The system of claim 17, wherein at least one of a high pressure compressor pressure ratio and a low pressure compressor pressure ratio is synthesized from the one or more sensed parameters by the controller.

\* \* \* \* \*